(12) United States Patent
Endico

(10) Patent No.: US 6,838,112 B1
(45) Date of Patent: Jan. 4, 2005

(54) PROCESS FOR PREPARING AN EMULSION BASED FOOD SALAD HAVING FREEZE-THAW STABILITY

(76) Inventor: Felix W. Endico, 444 E. 86th St., New York, NY (US) 10028

( * ) Notice: Subject to any disclaimer, the term of this patent is extended or adjusted under 35 U.S.C. 154(b) by 235 days.

(21) Appl. No.: 10/245,554

(22) Filed: Sep. 17, 2002

(51) Int. Cl.$^7$ ................................................ A23L 1/24
(52) U.S. Cl. .................... 426/605; 426/327; 426/524
(58) Field of Search ................ 426/524, 605, 426/613, 654, 321, 274, 275, 601, 327

(56) References Cited

U.S. PATENT DOCUMENTS

| | | | |
|---|---|---|---|
| 2,834,677 A | * 5/1958 | Geisler ........................ 426/275 |
| 3,539,354 A | * 11/1970 | Colvin ........................ 426/275 |
| 3,676,157 A | 7/1972 | Wintersdorff | |
| 3,690,898 A | * 9/1972 | Partyka ........................ 426/275 |
| 3,965,272 A | * 6/1976 | Epstein et al. ............... 426/524 |
| 4,248,902 A | 2/1981 | Eapen et al. | |
| 4,423,084 A | 12/1983 | Trainor et al. | |
| 4,555,410 A | 11/1985 | Yamane | |
| 6,468,577 B2 | * 10/2002 | Wofford ........................ 426/576 |
| 6,500,477 B2 | * 12/2002 | Wofford ........................ 426/576 |

OTHER PUBLICATIONS

McGee, H. 1984. On Food and Cooking. Collier Books, MacMillan Publishing Co., New York, p. 361–366.*
Potter, N. 1973. Food Science, 2nd edition. The AVI Publishing Co., Inc. Westport, CT, p. 204–215.*
US PgPub 2001/0026833 US PgPub 2003//0203096.*
US PgPub 2002/0076474.*

* cited by examiner

*Primary Examiner*—Carolyn Paden
(74) *Attorney, Agent, or Firm*—Howard Natter; Natter & Natter

(57) ABSTRACT

A process for making a freezably stable emulsion based food salad. A freezing point depression agent, such as propylene glycol, is added to a water component of the emulsion to prevent the formation of ice crystals during freezing of the non-aqueous salad components and to prevent oil separation upon thawing. A hardenable oil such as partially hydrogenated soybean oil, provides an elevated emulsion melt point. Microbial control is maintained during processing by oxygenating the water component. The frozen food salad may be-containerized for shipping or used as a frozen sandwich filling.

14 Claims, 2 Drawing Sheets

PROCESS FOR PREPARING AN EMULSION BASED FOOD SALAD HAVING FREEZE-THAW STABILITY

BACKGROUND OF THE INVENTION

1. Field of the Invention

This invention relates generally to food or edible materials and especially to a process for preparing an emulsion based food salad with improved low temperature properties.

In particular, this invention concerns a method for inhibiting physical change in an emulsion by contact with a chemical agent.

2. Background of the Invention

Emulsions are dispersions of one liquid in another with one of the liquids being water or an aqueous solution and the other liquid being an oil or water-immiscible liquid. Mayonnaise and mayonnaise-like emulsified dressings are comprised of oil-in-water emulsions. A problem with oil-in-water emulsions is lack of physical stability under low temperature conditions. During freezing ice crystals are formed within dispersed water droplets forcing the droplets closer together and inducing rupture of a thin film between the droplets. This causes the droplets to flow together and coalesce upon thawing. Protein-stabilized emulsions and emulsions having ionic surfactants tend to provide more resistance to coalescence however under extreme temperature conditions these inhibitors may not be effective, probably due in part to the physical changes brought about by interfacial rheology phenomena including dilation and shear which deform the droplets resulting in instability. Consequently, there is a breakdown of the emulsion and an undesirable separation of the oil from the water droplets upon thawing.

Emulsion based food salads commonly have a limited shelf-life and therefore are generally regionally produced for local non-frozen distribution. The ability to prepare a freezably stable emulsion based food salad is fundamental for accessing national and international markets. Frozen-phase salad distribution would thus provide economic benefits particularly in the commercial and institutional food service industry. The long-term storage advantages of frozen salad products would also expand production planning options, for example, larger manufacturing runs could be possible with excess product being frozen-preserved; manufacturing could be scheduled when ingredients are accessible and/or are in season and less expensive; and food processing could be scheduled when there is plant downtime with the product subsequently being frozen-stored to meet future supply demands. The process of this invention also opens opportunities for new products such as frozen salad sandwiches that are microwave stable.

Previous attempts to prepare freeze-thaw salad dressings include a process that utilizes a cooked starch base, as disclosed in U.S. Pat. No. 3,676,157. Another process, shown in U.S. Pat. No. 4,423,084, also requires cooked starch. A limitation of the previous processes is that they rely upon a starch base. Furthermore, the dressings described in the above patents are not intended for use in the manufacture of emulsion based food salads. Another shortcoming is that these processes are not effective for emulsions having a high fat content as in the present invention. A further limitation of the previously described processes is the lack of melt point control during the thawing stage. The prior processes further lack integrated microbial maintenance.

BRIEF SUMMARY OF THE INVENTION

Briefly, the nature of this invention concerns a process for the preparation of an aqueous emulsion for interaction with salad food components. The emulsion is formed from a combination of ingredients including oil, water, an emulsifier, seasoning, and other selected additives that are mechanically blended at temperatures above freezing. The water is preferably oxygenated to provide oxidative disinfection during processing of the emulsion. A food-grade solute is added to depress the freezing point of the water content. A hardenable oil component is introduced to raise the melting point. The emulsion is then chilled, the food components are blended, the emulsion is then subjected to still lower temperatures whereby the non-aqueous food components are frozen. The product is thawed prior to consumption and/or kept under refrigeration for distribution to ultimate consumers.

A feature of the process of this invention is the introduction of an anti-freeze agent to the emulsion moisture content for lowering the freezing point.

Having summarized the invention, it will be seen that it is a preferred object of this invention to provide a process for preparing an emulsion based food salad with freeze-thaw stability that is not subject to the limitations of the background art.

Another preferred object of this invention is to provide a process for preparing an emulsion based food salad wherein the emulsion has a depressed freezing point.

An additional preferred object of this invention is to provide a process for preparing an emulsion based food salad wherein the emulsion has an elevated melting point.

Yet another preferred object of this invention is to provide process for preparing an emulsion based food salad wherein the emulsion moisture component provides oxidative action for reduction of microbial activity.

Still yet another preferred object of this invention is to provide a process for preparing an emulsion based food salad suitable for making frozen sandwich fillings.

With these ends and view, the invention finds embodiment in a procedure by which the aforementioned preferred objects and certain another preferred objects are hereinafter attained, all as more fully described with reference to the accompanying drawings and the scope of which is more particularly pointed out and indicated in the appended claims.

BRIEF DESCRIPTION OF THE DRAWINGS

In the accompanying drawings in which is shown an exemplary procedure in accordance with the principles of this invention.

DETAILED DESCRIPTION OF THE INVENTION

With specific reference now to the drawings, it is stressed that the particulars shown and described herein are for the purpose of illustrative discussion of the process of this invention and are presented in the cause of providing what is believed to be the most useful and readily understood description of the principles and conceptual aspects of this invention. In this regard, no attempt has been made to show the process in more detail then is necessary for a fundamental understanding of the invention however, the description, in combination with the drawings, should make apparent to those skilled in the art how the process may be applied in practice.

For the purpose of this illustrative embodiment, the invention will be described with reference to the manufacture of a freeze resistant mayonnaise-like emulsion for interaction with salad food components.

Figure 1:
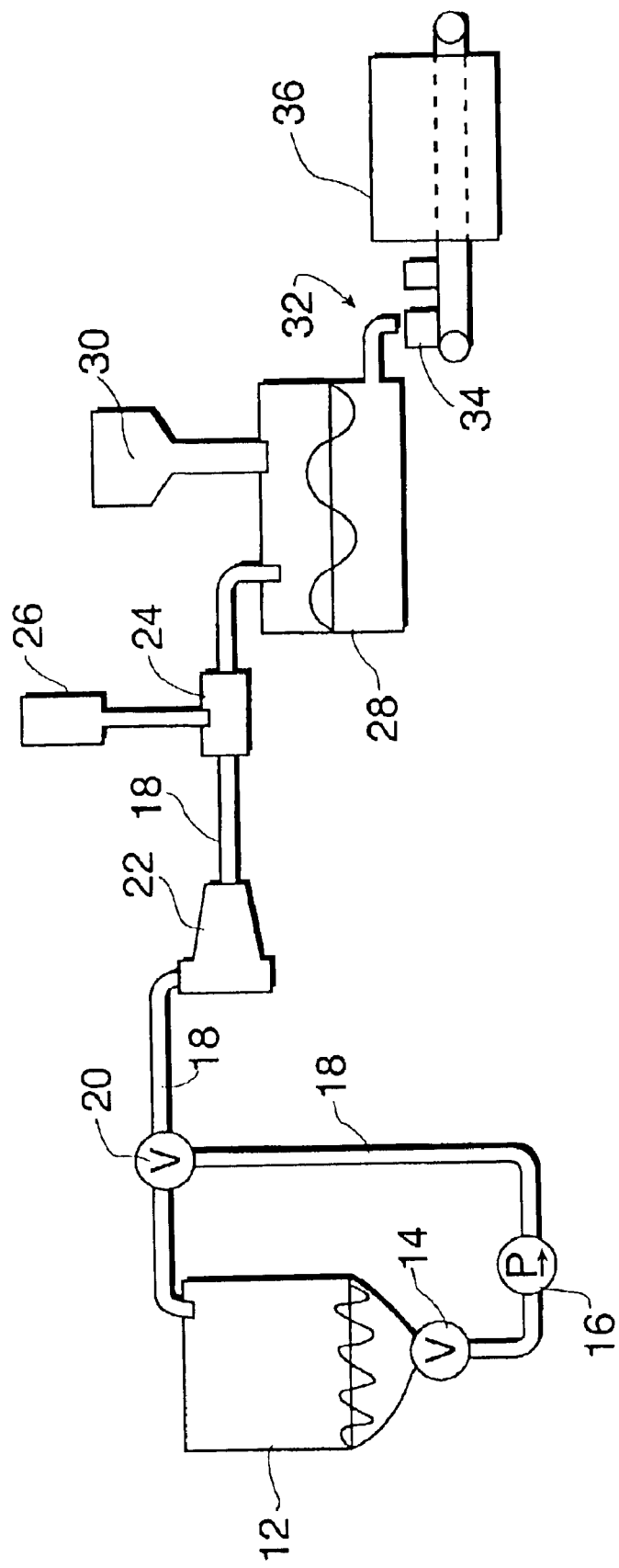
FIG. 1 is a schematic diagram illustrating and apparatus for implementing the process of this invention.

With reference to FIG. 1, there is shown a schematic representation of the process and apparatus of this invention. The initial step involves the preparation of a pre-emulsion mix consisting primarily of oil, water, an emulsifier, acetic acid, corn syrup, spices and flavoring agents, and a stabilizer as more particularly set forth hereinafter. Additionally, a freezing point depression agent, and a melting point elevation agent, are incorporated in accordance with the method of this invention.

A charge of pre-weighed ingredients is dispensed into a mixer 12, preferably a high shear mixer, for mechanical agitation and particle dispersion. A discharge valve 14 e.g. a remotely activated stainless steel sanitary ball value, and a positive displacement pump 16, such as a stainless steel flexible impeller pump, are used for discharging the contents from the mixer 12 and transporting the contents through a conduit network 18. The conduit network 18 is preferably flexible sanitary tubing. The pre-emulsion mix is recirculated through a two-way valve 20, e.g. a diaphragm value, for return to the mixer 12 until a desired reduction in particle size is achieved. The two-way valve 20 is manually and/or remotely activated for diverting the pre-emulsion mix to a colloidal mill 22 for further particle dispersion and reduction in particle size to form an emulsion slurry. The above mixing and emulsification procedure is preferably performed at above freezing temperatures of approximately 42° F. to provide stability to the emulsion.

The emulsion slurry is then passed through a sparging station 24 wherein an inert gas is released from a pressurized tank 26 and injected into the slurry to "fluff" or expand particle spacing of the emulsion.

The emulsion slurry is then discharged into a ribbon blender 28. The blender 28 is preferably jacketed to provide for heat removal by circulation of an iced brine solution or a freon gas; alternatively dry-ice may be added to chill the emulsion slurry. Selected salad food components are then introduced from a holding tank 30 and blended in the emulsion slurry to form a suspension of food particles. The chilled emulsion is then dispensed, at a fill station 32, into containers 34. The containers 34 are moved by a conveyer through a freezing unit 36. The containerized frozen product is discharged from the freezing unit 36 for shipping in a frozen phase. Alternatively, the chilled salad emulsion slurry can be dispensed as a sandwich fill and deposited within an edible bread covering, typically formed as a pocket, which can then be frozen.

Figure 2:
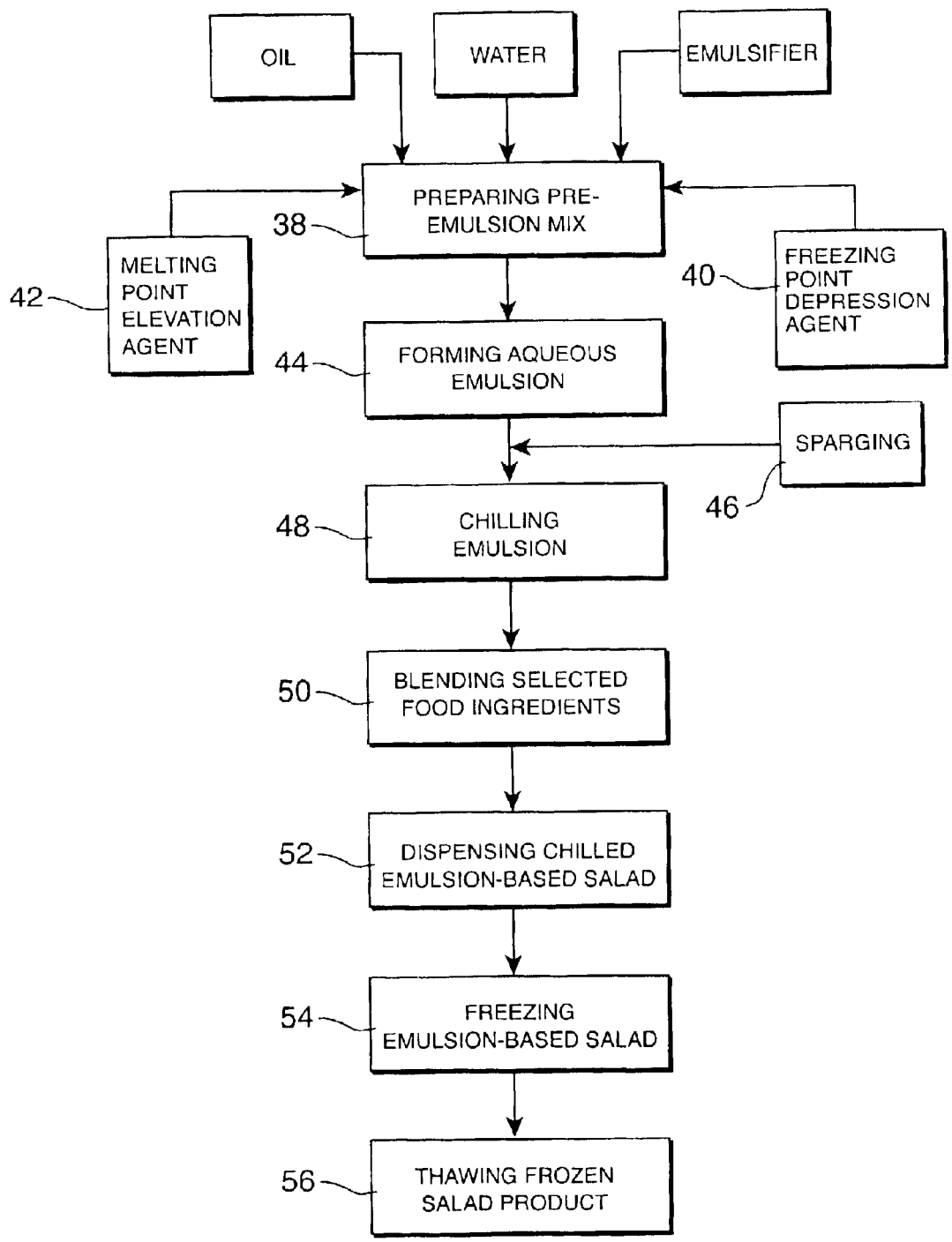
FIG. 2 is a flow diagram illustrating the processing sequence in accordance with this invention.

Referring now to FIG. 2, reference numeral 38 denotes the initial step of preparing the pre-emulsion mix. For illustrative purposes a typical pre-emulsion mix contains essentially the following:

| Ingredient | % by weight | Ingredient | % by weight |
| --- | --- | --- | --- |
| Vegetable Oil | 52.0 | Mustard Powder | 0.40 |
| Hardenable Oil[a] | 13.0 | Sodium Chloride | 0.60 |
| Water[b] | 19.5 | Potassium Chloride | 0.60 |
| Propylene Glycol[c] | 4.9 | Stabilizer[d] | 0.50 |

-continued

| Ingredient | % by weight | Ingredient | % by weight |
| --- | --- | --- | --- |
| Acetic Acid[e] | 0.4 | EDTA[f] | 0.08 |
| High Fructose Corn Syrup | 2.0 | Preservative[g] | 0.02 |
| Egg Yolks | 6.0 | Total | 100.00 |

[a]partially hydrogenated soybean oil, coconut oil, or palm oil
[b]oxygenated or ozonated
[c]alcohol or glycerin may be substituted
[d]xanathan gum
[e]vinegar
[f]ethylenediamine tetraacetate
[g]potassium sorbate or benzoate The vegetable oil may, for example, be canola oil, corn oil, etc. The hardenable oil is typically partially hydrogenated soybean oil, palm oil, or coconut oil. As a partially hydrogenated soybean oil, coconut oil, or palm oil. As previously mentioned, the water component may optionally be oxygen-enriched, such as ozonated water. The ozonated water provides oxidative disinfection of the pre-emulsion during processing and further interacts with the acetic acid in the vinegar to form peracetic acid which releases free oxygen radicals and hydroxyl ions for oxidative disinfection.

A freezing point depression agent, typically food-grade propylene glycol, denoted at reference numeral 40, is dissolved in the water component of the pre-emulsion mix to lower the freezing point and to retard crystallization. It should further be understood that although propylene glycol is the preferred "antifreeze", alternative solutes such as glycerin and/or alcohol may be substituted. By way of example, the propylene glycol dissolved in water constitutes about 20 percent of the moisture content in the emulsion and together with the sodium chloride cumulatively reduces the freeze point. The egg yolk provides a surface active protein emulsifier to resist coalescence, and the potassium chloride generates increased ionic charge for stabilizing the emulsion; the xanathan gum also stabilizes the emulsion.

A melting point elevation agent, typically a partially hydrogenated oil that is semisolid or plastic at room temperature, as denoted at 42, is introduced to raise the melt point and stabilize the fat phase upon thawing. This effectively reduces "weeping" or non-uniform defrosting upon thawing.

Referring once again to FIG. 2 the aforementioned pre-emulsion mix is subjected to high shear mixing and colloidal milling for deforming and breaking up the pre-emulsion particles during this emulsification processing, as indicated at 44, to form an aqueous emulsion slurry.

Reference numeral 46 indicates the step of sparging the emulsion slurry by injecting nitrogen, under pressure, while maintaining the particle size and uniformity of the emulsion.

The emulsion slurry is then subjected at chilling to a temperature range of approximately 25° F. to 35° F., as indicated at 48, prior to the introduction and blending of the food components shown by reference numeral 50. The salad food components may, for example, consist of particulated tuna, chicken, hard-boiled egg, seafood, or similar salad foods. By way of example, the chicken component may include diced white chicken, and complementary ingredients, such as, chopped celery and bread crumbs. The chilled emulsion-based salad is then dispensed, as shown at 52, into containers, or dispensed as a sandwich filling, or otherwise packaged for ultimate distribution. When used for sandwich fillings the chilled salad emulsion is deposited between edible bread or similar covering and then frozen.

The product is then subjected to freezing at a relatively slow rate, as denoted at 54, to a temperature of between (negative)-10° F. and 32° F. It should be noted that the reduction of temperature is effective for freezing the food components however, the lowered freezing point of the water component in the emulsion will prevent the formation of ice crystals and the detrimental effect to the emulsion that would be caused by freezing. The salad product is then be shipped to consumers in the frozen phase. The frozen salad product is thawed, as shown at 56, prior to use and may be kept refrigerated at approximately 38° F. for about thirty to forty days prior to consumption. The frozen sandwich may also be rapidly defrosted, using microwave energy, immediately before consumption.

It should thus be seen that there is provided a process for preparing an emulsion based food salad having freeze-thaw stability which achieves the various preferred objects of this invention and which is well adapted to meet conditions of practical use.

Since other possible variations of the treatment process described herein might be made to the exemplary form set forth, it is to be understood that the process as shown and described should be interpreted as illustrative and not in a limiting sense.

Having thus described the invention, there is claimed as new and desired to be secured by Letters Patent:

What is claimed is:

1. A process for preparing an emulsion based food salad having freeze-thaw stability including the steps of:
   a) preparing a pre-emulsion mix essentially containing oil, water, an emulsifier, and a freezing point depression agent comprising at least one of propylene glycol, glycerin and alcohol;
   b) subjecting the pre-emulsion mix to mechanical agitation to form an aqueous emulsion;
   c) chilling the emulsion;
   d) blending selected non-aqueous solid food components to form a salad; and
   e) freezing the non-aqueous solid food components of the emulsion.

2. A process for preparing an emulsion based food salad as claimed in claim 1 wherein the freezing point depression agent is propylene glycol.

3. A process for preparing an emulsion based food salad as claimed in claim 1 including the step of adding a melting point elevation agent to the pre-emulsion mix.

4. A process for preparing an emulsion based food salad as claimed in claim 3 wherein the melting point elevation agent is a hardenable oil.

5. A process for preparing an emulsion based food salad as claimed in claim 4 wherein the hardenable oil is at least one of partially hydrogenated soybean oil, partially hydrogenated palm oil, and partially hydrogenated coconut oil.

6. A process for preparing an emulsion based food salad as claimed in claim 1 wherein the water component is ozonated water.

7. A process for preparing an emulsion based food salad as claimed in claim 1 further including the step of sparging the emulsion prior to the chilling step.

8. A process for preparing an emulsion based food salad as claimed in claim 1 wherein the food salad is containerized prior to the freezing step.

9. A process for preparing an emulsion based food salad as claimed in claim 1 further including the step of dispensing the chilled salad emulsion within an edible coverage to form a sandwich and freezing the sandwich containing the emulsion filing.

10. A process for preparing an emulsion based food salad as claimed in claim 1 wherein the emulsion is chilled to a temperature of between 25° F. and 35° F.

11. A process for preparing an emulsion based food salad as claimed in claim 1 wherein the emulsion is frozen at a temperature of between −10° F. and 32° F.

12. A process for preparing an emulsion based food salad as claimed in claim 1 where the pre-emulsion mixing is conducted at a temperature of approximately 42° F.

13. A process for preparing an emulsion based food salad as claimed in claim 1 further including the step of:
   f) thawing the frozen salad emulsion; and
   g) refrigerating the thawed emulsion prior to consumption.

14. An emulsion based food salad prepared in accordance with the process of claim 1.

\* \* \* \* \*